US008082264B2

(12) United States Patent
Bierner

(10) Patent No.: US 8,082,264 B2
(45) Date of Patent: Dec. 20, 2011

(54) AUTOMATED SCHEME FOR IDENTIFYING USER INTENT IN REAL-TIME

(75) Inventor: Gann Alexander Bierner, San Bruno, CA (US)

(73) Assignee: Inquira, Inc., Redwood Shores, CA (US)

(*) Notice: Subject to any disclaimer, the term of this patent is extended or adjusted under 35 U.S.C. 154(b) by 398 days.

(21) Appl. No.: 11/959,307

(22) Filed: Dec. 18, 2007

(65) Prior Publication Data

US 2008/0104037 A1 May 1, 2008

Related U.S. Application Data

(63) Continuation-in-part of application No. 10/820,341, filed on Apr. 7, 2004, and a continuation-in-part of application No. 11/464,443, filed on Aug. 14, 2006, now Pat. No. 7,747,601.

(60) Provisional application No. 60/883,279, filed on Jan. 3, 2007.

(51) Int. Cl.
*G06F 17/30* (2006.01)
(52) U.S. Cl. ......... 707/767; 707/768; 707/771; 715/816
(58) Field of Classification Search .......... 707/705–708, 707/771, 766–768; 715/816
See application file for complete search history.

(56) References Cited

U.S. PATENT DOCUMENTS

| 4,956,774 A | 9/1990 | Shibamiya et al. |
| 5,321,833 A | 6/1994 | Chang et al. |
| 5,357,436 A | 10/1994 | Chiu |
| 5,386,556 A | 1/1995 | Hedin et al. |
| 5,442,782 A | 8/1995 | Malatesta et al. |
| 5,535,382 A | 7/1996 | Ogawa |
| 5,608,624 A | 3/1997 | Luciw |
| 5,625,814 A | 4/1997 | Luciw |
| 5,694,523 A | 12/1997 | Wical |

(Continued)

FOREIGN PATENT DOCUMENTS

WO    WO 0188662 A2    11/2001

(Continued)

OTHER PUBLICATIONS

Zaïane et al., Finding Similar Queries to Satisfy Searches Based on Query Traces. Advances in Object-Oriented Information Systems, Lecture Notes in Computer Science. vol. 2426/2002. [online], 2002 [retrieved on Nov. 18, 2010]. Retrieved from the Internet:< URL:http://www.springerlink.com/content/h2ukf5jflymp6dr7/fulltext.pdf>. pp. 207-216.*

(Continued)

*Primary Examiner* — John Cottingham
*Assistant Examiner* — James E Richardson
(74) *Attorney, Agent, or Firm* — Kilpatrick Townsend & Stockton LLP

(57) ABSTRACT

An intent guessing system receives partial user queries as they are entered by the user. The partial user queries are compared with different intents derived from previously logged queries. Guesses are made as to which of the intents are associated with the partial user query. The intent guesses are then provided as responses to the user query. Features are identified for the earlier logged queries and associated with the derived intents. The derived intents and associated features are then used to identify intents for the partial user queries.

15 Claims, 6 Drawing Sheets

U.S. PATENT DOCUMENTS

| | | | |
|---|---|---|---|
| 5,694,546 A | 12/1997 | Reisman | |
| 5,742,816 A | 4/1998 | Barr et al. | |
| 5,794,050 A | 8/1998 | Dahlgren et al. | |
| 5,812,865 A | 9/1998 | Theimer et al. | |
| 5,826,269 A | 10/1998 | Hussey | |
| 5,848,399 A | 12/1998 | Burke | |
| 5,873,056 A | 2/1999 | Liddy et al. | |
| 5,873,076 A | 2/1999 | Barr et al. | |
| 5,873,080 A | 2/1999 | Coden et al. | |
| 5,878,423 A | 3/1999 | Anderson et al. | |
| 5,884,302 A | 3/1999 | Ho | |
| 5,890,152 A | 3/1999 | Rapaport et al. | |
| 5,893,091 A | 4/1999 | Hunt et al. | |
| 5,897,622 A | 4/1999 | Blinn et al. | |
| 5,901,287 A | 5/1999 | Bull et al. | |
| 5,913,215 A | 6/1999 | Rubinstein et al. | |
| 5,933,822 A | 8/1999 | Braden-Harder et al. | |
| 5,948,054 A | 9/1999 | Nielsen | |
| 5,963,940 A | 10/1999 | Liddy et al. | |
| 5,966,695 A | 10/1999 | Melchione et al. | |
| 5,974,412 A | 10/1999 | Hazlehurst et al. | |
| 5,987,454 A | 11/1999 | Hobbs | |
| 5,995,921 A | 11/1999 | Richards et al. | |
| 6,006,225 A | 12/1999 | Bowman et al. | |
| 6,016,476 A | 1/2000 | Maes et al. | |
| 6,021,403 A | 2/2000 | Horvitz | |
| 6,026,388 A | 2/2000 | Liddy et al. | |
| 6,028,601 A | 2/2000 | Machiraju et al. | |
| 6,038,560 A | 3/2000 | Wical | |
| 6,052,710 A | 4/2000 | Saliba et al. | |
| 6,061,057 A | 5/2000 | Knowlton et al. | |
| 6,070,149 A | 5/2000 | Tavor et al. | |
| 6,078,914 A | 6/2000 | Redfern | |
| 6,151,600 A | 11/2000 | Dedrick | |
| 6,208,991 B1 | 3/2001 | French et al. | |
| 6,233,547 B1 | 5/2001 | Denber | |
| 6,260,035 B1 | 7/2001 | Horvitz et al. | |
| 6,278,996 B1 | 8/2001 | Richardson et al. | |
| 6,282,534 B1 | 8/2001 | Vora | |
| 6,285,998 B1 | 9/2001 | Black et al. | |
| 6,370,535 B1 | 4/2002 | Shapiro | |
| 6,385,592 B1 | 5/2002 | Angles et al. | |
| 6,393,479 B1 | 5/2002 | Glommen et al. | |
| 6,401,084 B1 | 6/2002 | Ortega et al. | |
| 6,401,094 B1 | 6/2002 | Stemp et al. | |
| 6,466,899 B1 | 10/2002 | Yano | |
| 6,471,521 B1 | 10/2002 | Dornbush et al. | |
| 6,477,551 B1 | 11/2002 | Johnson et al. | |
| 6,480,843 B2 | 11/2002 | Li | |
| 6,564,213 B1* | 5/2003 | Ortega et al. | 1/1 |
| 6,584,464 B1 | 6/2003 | Warthen | |
| 6,675,159 B1 | 1/2004 | Lin et al. | |
| 6,766,320 B1 | 7/2004 | Wang et al. | |
| 6,907,414 B1 | 6/2005 | Parnell | |
| 6,928,425 B2 | 8/2005 | Grefenstette et al. | |
| 6,941,301 B2 | 9/2005 | Ferguson et al. | |
| 6,944,711 B2 | 9/2005 | Mogi et al. | |
| 6,957,213 B1 | 10/2005 | Yuret | |
| 7,024,400 B2 | 4/2006 | Tokuda et al. | |
| 7,035,864 B1 | 4/2006 | Ferrari et al. | |
| 7,035,910 B1 | 4/2006 | Dutta et al. | |
| 7,111,290 B1 | 9/2006 | Yates | |
| 7,177,795 B1 | 2/2007 | Chen et al. | |
| 7,181,731 B2 | 2/2007 | Pace | |
| 7,209,921 B2 | 4/2007 | Pace | |
| 7,254,806 B1 | 8/2007 | Yates | |
| 7,428,541 B2 | 9/2008 | Houle | |
| 7,668,850 B1 | 2/2010 | Bierner | |
| 7,672,951 B1 | 3/2010 | Bierner | |
| 7,676,517 B2* | 3/2010 | Hurst-Hiller et al. | 707/713 |
| 2001/0014888 A1 | 8/2001 | Tsuchida et al. | |
| 2001/0047270 A1 | 11/2001 | Gusick et al. | |
| 2002/0049738 A1 | 4/2002 | Epstein | |
| 2002/0051020 A1 | 5/2002 | Ferrari | |
| 2002/0078090 A1 | 6/2002 | Hwang et al. | |
| 2002/0103809 A1 | 8/2002 | Starzl et al. | |
| 2003/0014403 A1* | 1/2003 | Chandrasekar et al. | 707/5 |
| 2003/0018512 A1 | 1/2003 | Dortmans | |
| 2003/0037073 A1 | 2/2003 | Tokuda et al. | |
| 2003/0101153 A1 | 5/2003 | Francis et al. | |
| 2003/0144994 A1 | 7/2003 | Wen et al. | |
| 2003/0204435 A1 | 10/2003 | McQuilkin et al. | |
| 2003/0217052 A1 | 11/2003 | Rubenczyk et al. | |
| 2003/0233224 A1 | 12/2003 | Marchisio et al. | |
| 2004/0024739 A1 | 2/2004 | Copperman et al. | |
| 2004/0167870 A1 | 8/2004 | Wakefield et al. | |
| 2005/0080775 A1 | 4/2005 | Colledge et al. | |
| 2005/0120045 A1 | 6/2005 | Klawon | |
| 2005/0149496 A1* | 7/2005 | Mukherjee et al. | 707/3 |
| 2005/0198563 A1 | 9/2005 | Kristjansson | |
| 2005/0203878 A1* | 9/2005 | Brill et al. | 707/3 |
| 2005/0234969 A1 | 10/2005 | Mamou et al. | |
| 2005/0267871 A1 | 12/2005 | Marchisio et al. | |
| 2006/0059073 A1 | 3/2006 | Walzak | |
| 2006/0074836 A1 | 4/2006 | Gardner | |
| 2006/0095326 A1 | 5/2006 | Sandhu et al. | |
| 2006/0106769 A1* | 5/2006 | Gibbs | 707/3 |
| 2006/0122979 A1 | 6/2006 | Kapur et al. | |
| 2006/0136403 A1 | 6/2006 | Koo | |
| 2006/0179404 A1 | 8/2006 | Yolleck et al. | |
| 2006/0253427 A1* | 11/2006 | Wu et al. | 707/3 |
| 2006/0259483 A1 | 11/2006 | Ozana | |
| 2006/0265232 A1 | 11/2006 | Katariya et al. | |
| 2007/0033116 A1 | 2/2007 | Murray | |
| 2007/0208738 A1* | 9/2007 | Morgan | 707/6 |
| 2007/0282769 A1 | 12/2007 | Bierner | |
| 2008/0189163 A1 | 8/2008 | Rosenberg | |
| 2008/0215976 A1 | 9/2008 | Bierner | |
| 2008/0243761 A1 | 10/2008 | Guo | |
| 2008/0294651 A1 | 11/2008 | Masuyama et al. | |
| 2009/0077047 A1 | 3/2009 | Cooper | |
| 2009/0083224 A1 | 3/2009 | Dettinger et al. | |
| 2009/0089044 A1 | 4/2009 | Cooper | |

FOREIGN PATENT DOCUMENTS

| | | |
|---|---|---|
| WO | WO 0235376 A2 | 5/2002 |
| WO | WO/2007/134128 | 11/2007 |
| WO | WO/2008/022150 | 2/2008 |
| WO | WO/2008/067316 | 5/2008 |

OTHER PUBLICATIONS

Baeza-Yates et al. "Query Recommendation Using Query Logs in Search Engines" Mar. 2004, Current Trends in Database Technology—EDBT 2004 Workshops, pp. 588-596.*

Madhavan et al, "Semantic Mappings for Data Mediation", Feb. 2002, <pages.cs.wisc.edu/~anhai/talks/JayantMadhavan-Affiliates2002.ppt>, p. 1-17.

Raghavan, S. et al. Crawling the Hidden Web. Computer Science Department, Stanford University, 2001, pp. 1-25, especially pp. 1-15.

Don Clark, "AnswerFriend Seeks to Sell Question-Answering Software," Wall Street Journal, Aug. 24, 2000.

Deniz Yuret, "Discovery of Linguistic Relations Using Lexical Attraction" PhD Thesis, MIT, May 15, 1998.

Deniz Yurt "Lexical Attractino Models of Language." Submitted to The Sixteenth National Conference on Artificial Intelligence, 1999.

Boris Katz, Deniz Yuret, et al. "Integrating Large Lexicons and Web Resources into a Natural Language Query System." To appear in Proceedings of the IEEE International Conference on Multimedia Computing and Systems, 1999.

International Preliminary Report on Patentability and Written Opinion of the International Seaching Authority for PCT/US2007/068597; International Searching Authority/US; Nov. 11, 2008.

International Search Report for PCT/US2007/068597; International Searching Authority/US; May 22, 2008.

International Preliminary Report on Patentability and Written Opinion of the International Searching Authority for PCT/US2007/075929; International Searching Authority/US; Feb. 17, 2009.

International Search Report for PCT/US2007/075929; International Searching Authority/US; Jan. 21, 2008.

International Preliminary Report on Patentability and Written Opinion of the International Seaching Authority for PCT/US2007/085646; International Searching Authority/US; Jun. 3, 2009.

International Search Report for PCT/US2007/085646; International Searching Authority/US; Jul. 23, 2008.

International Search Report for PCT/US2001/15711; International Searching Authority/US; Nov. 6, 2001.

International Preliminary Examination Report for PCT/US2001/15711; IPEA/US; Date of completion of report Feb. 16, 2005.

Stolowitz Ford Cowger LLP, Listing of Related Cases, Aug. 19, 2009.

Internet Archive, Wayback Machine, website pages from LLBean, Feb. 29, 2000.

Chien, Steve, et al., "Semantic similarity between search engine queries using temporal correlation", In Proceedings of the 14th international conference on World Wide Web, Chiba, Japan; Session: Usage analysis, p. 2-11; published May 10-14, 2005; http://www.ra.ethz.ch/CDstore/www2005/docs/p2.pdf.

* cited by examiner

AUTOMATED SCHEME FOR IDENTIFYING USER INTENT IN REAL-TIME

The present application claims priority to provisional application Ser. No. 60/883,279, filed Jan. 3, 2007 which is incorporated by reference in its entirety.

The present application is also a continuation in part of U.S. patent application Ser. No. 10/820,341, filed Apr. 7, 2004, entitled: AN IMPROVED ONTOLOGY FOR USE WITH A SYSTEM, METHOD, AND COMPUTER READABLE MEDIUM FOR RETRIEVING INFORMATION AND RESPONSE TO A QUERY which is also incorporated by reference in its entirety and is a continuation in part of co-pending U.S. patent application Ser. No. 11/464,443, filed Aug. 14, 2006, entitled: METHOD AND APPARATUS FOR IDENTIFYING AND CLASSIFYING QUERY INTENT which is also herein incorporated by reference in its entirety.

BACKGROUND

Automatic information retrieval, search, and customer self service systems must, in some manner, understand an end user's query to a sufficient degree to be able to retrieve or construct an appropriate response. For keyword based systems this might simply involve the ability to extract keywords (important terms) from the query as well as interpret some simple operators such as NOT, OR, and PHRASE. For example, the following query: SHOW ME ALL DOCUMENTS CONTAINING THE WORDS "PYTHON" OR "COBRA" BUT NOT THE PHRASE "MONTY PYTHON" might be understood to mean: (PYTHON OR COBRA) NOT "MONTY PYTHON".

A more sophisticated system might understand the same meaning from the natural language query "SHOW ME INFORMATION ABOUT PYTHONS AND COBRAS" by understanding from the question's concepts that the desired answers are about snakes and not about the comedy troupe Monty Python. An even more sophisticated system might understand large classes of questions that effectively mean the same thing. For example, "HOW DO YOU CHECK YOUR BALANCE?", "HOW MUCH MONEY DO I HAVE?", "I'D LIKE TO VIEW MY CURRENT STATEMENT.", etc. may all be interpreted to mean the same thing. These question classes are called intents.

Some query systems attempt to understand a query while a user is completing the question. For example, a search engine may try to automatically provide suggestions for a search field of a web page while the user is still typing in the entry. This potentially reduces the time and effort required by the user to enter their query and possibly helps the user be more precise and avoid mistakes. This technique is primarily embodied as variants of what is often referred to as field "auto-completion". The system analyzes the query as the user is typing it in and proposes possible completions for the query from which the user can choose. For example, if the user types "golden" then the system might respond with "golden mean," "golden retriever," "Golden Gate," etc. These suggestions may be produced in any number of ways such as by rule based systems or statistical methods. However, all the suggestions begin with (or in some cases contain) the same text already input by the user.

DETAILED DESCRIPTION

Intent Guesser

Figure 1:
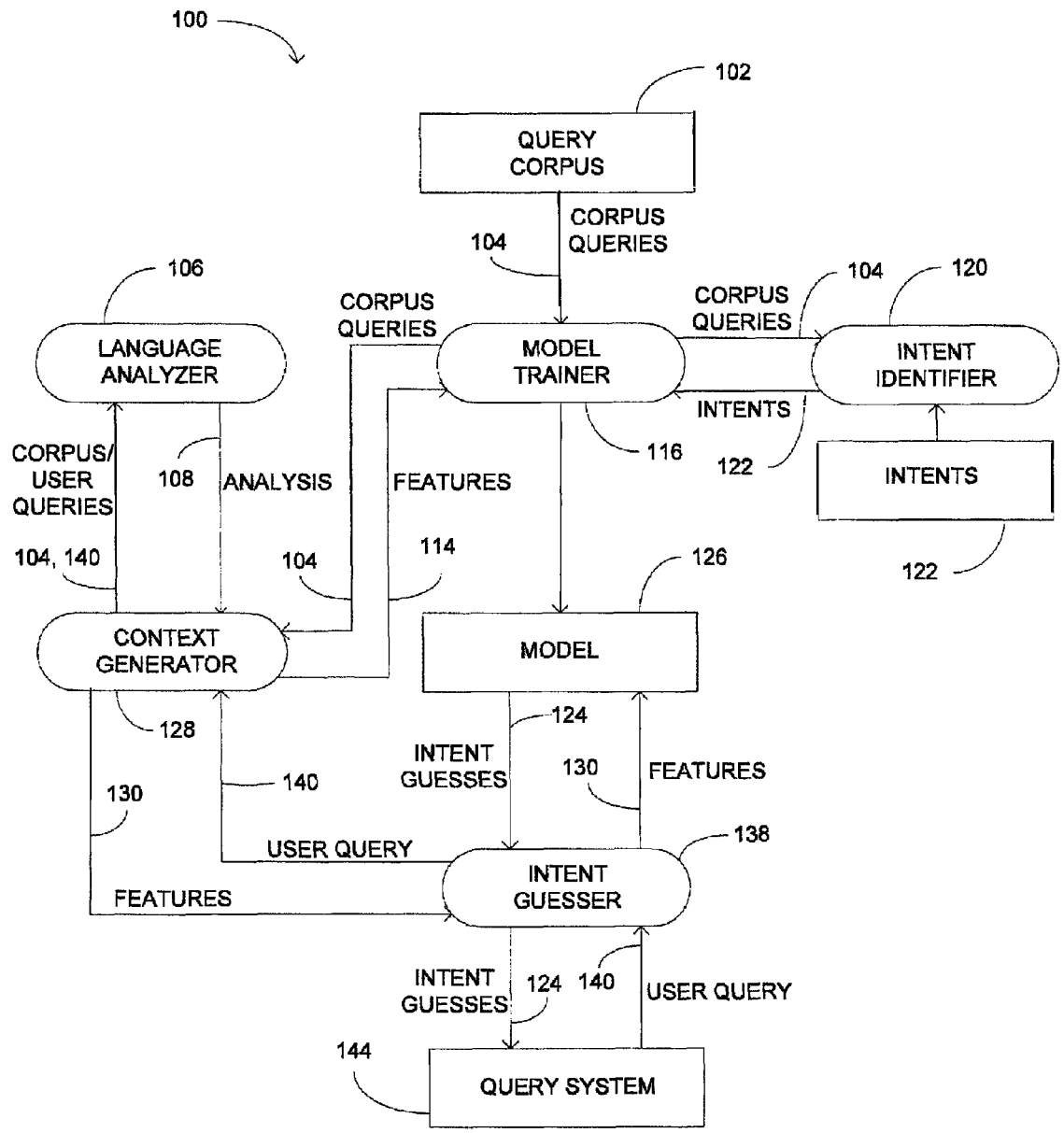
FIG. 1 is a flow chart illustrating a system for guessing query intents.

FIG. 1 illustrates an intent guessing system 100 that goes beyond simple auto-completion to guessing user intents as the user is typing a query. This frees the system 100 from providing only guesses that match the same text as the user's current input. Intent guessing uses a statistical classification system to produce a model 126 which can then be used by an intent guesser 138 to provide possible intent guesses. The system 100 in one example uses a maximum entropy classification system, however other embodiments may use other classification systems that may produce comparable results.

A classification system associates inputs with an outcome via features created from the input. This process results in a model which can then produce possible outcomes (with probabilities indicating their likely correctness) given a new input. In the case of intent guesser 138, the input is a user query 140, the outcome is an intent guess 124, and the features 130 used to produce the outcome 124 based on a linguistic analysis of the user query 140.

To explain in more detail, a model trainer 116 is software that creates a model 126 from a query corpus 102. The query corpus 102 is a list of questions similar to the questions that might be entered into the query system 144. For example, an enterprise server may continuously log queries that are entered into an enterprise web-site. The queries are stored in memory and all or some subset of the past queries may be used in query corpus 102.

This query corpus 102 may be updated from time to time to reflect the most recent and/or most common questions that are being asked by people accessing the enterprise website. For example, an updated query corpus 102 may contain common questions that enterprise customers ask about new enterprise products. The query corpus 102 need not be an exhaustive list of all possible questions (as this is not possible), but the larger the corpus, the better the results are likely to be.

A model trainer 116 forwards the corpus queries 104 to a context generator 128 and receives back features 114. The context generator 128 creates the features 114 from a linguistic analysis of the corpus queries 104 using a language analyzer 106 which is described in co-pending U.S. patent application Ser. No. 10/820,341, filed Apr. 7, 2004, entitled: AN IMPROVED ONTOLOGY FOR USE WITH A SYSTEM, METHOD, AND COMPUTER READABLE MEDIUM FOR RETRIEVING INFORMATION AND RESPONSE TO A QUERY which is incorporated by reference in its entirety.

The context generator 128 feeds the corpus queries 104 to the language analyzer 106 and receives back analysis data 108 that identifies the different language characteristics. For example, the context generator 128 in combination with the language analyzer identifies different words and different concepts in the corpus queries 104. The context generator 128 sends these different features 114 back to the model trainer 116. Examples of features 114 include, but are not limited to: query tokens (e.g., words, numbers, punctuation marks); their stems (the words stripped of morphology—"dog" instead of "dogs"); and concepts (e.g. <canine> instead of "dog" or "mutt").

The model trainer 116 sends the same corpus queries 104 to an intent identifier 120. The intent identifier 120 identifies the intents 124 that match the corpus queries 104 and sends the matching intents 122 back to the model trainer 116. Generating intents 122 and matching intents with queries is described in co-pending U.S. patent application Ser. No. 11/464,443, filed Aug. 14, 2006, entitled: METHOD AND APPARATUS FOR IDENTIFYING AND CLASSIFYING QUERY INTENT which is herein incorporated by reference in its entirety.

The intents 122 may be created by an enterprise specialist based on the information provided on the enterprise website, the subject matter associated with the enterprise and industry, and the questions previously submitted to the website by different people.

The model trainer 116 receives the features 114 back from the context generator 128 and receives the intents 122 from intent identifier 120 that are all associated with those same corpus queries 104. The model trainer 116 creates a model 126 that affiliates the corpus query features 114 with different intents 122. The exact nature of the model 126 will vary depending on the technology used, but in one embodiment comprises a data structure with statistical associations between features and outcomes. There are many implementation possibilities for of the model 126 that are known to those knowledgeable in the field.

Query Intent Guessing

The query system 114 uses the intent guesser 138 to retrieve a list of intent guesses 124 ordered by their probable correctness. Like the model trainer 116, the intent guesser 138 submits user queries 140 received from query system 144 to the context generator 128. Similar to the corpus queries 104, the context generator 128 uses the language analyzer 106 to decompose the user queries 140 into different features 130 that may include, but are not limited to, tokens (e.g., words, numbers, punctuation marks); their stems (the words stripped of morphology—"dog" instead of "dogs"); and concepts (e.g., <canine> instead of "dog" or "mutt").

The intent guesser 138 feeds the features 130 received from the context generator 128 into model 126 and receives back a list of one or more intent guesses 124. The intent guesses 124 are provided to the query system and then displayed to the user that submitted the original user query 140.

It is worth noting that intents 124 are pieces of information that attempt to surmise the thought or "intent" associated with the query 140 while the user is entering the query and possibly before the user has completed the entire query 140. Accordingly, the intent guesses 124 may not necessarily include any of the words used in the corpus queries 104 or any of the actual words used in the user query 140. This makes the intent guessing system 100 extremely powerful, since the actual words entered by the user in query 140 do not necessarily restrict what responses can be provided by the intent guessing system 100.

This is particularly pertinent for query guesses 124 that are provided while the query is still being entered. Initial words used in a query may have little or no relevance for conventional auto-fill-in software. However, in an intent guessing system, the first few words could provide substantial information about what the user is actually thinking. Thus, the intent guessing system 100 would be able to identify and complete the intended relevant query for the user more quickly.

The intent guesses 124 can also provide more relevant query responses. For example, a user may not know the precise name of a product. Common rule based query systems may never be able to accurately complete or respond to the user query 140, since the user never provides the appropriate key words. However, the intent guessing system 100 has the capacity to surmise what the user is thinking based on the meanings of the words and concepts in the query 140 and the pre-created intents 124 associate with those words and concepts. The system 100 can derive this user intent even when the user does not use the correct key words in the query 140.

As an example with respect to cell phones, if the user were to type "CAN I ADD" as user query 140, the intent guesser system 100 might suggest intent guesses 124 of: "ADDITIONAL LINE OR PHONE", "PURCHASING MINUTES", etc. As another example, typing the user query 140 "WHAT IS THE RATE" might produce intent guesses 124 of: "SERVICE PLAN MINUTES RESEARCH", "INTERNATIONAL CALLING RESEARCH", AND "SERVICE PLAN RESEARCH". However, if the user completes the query 140 to "WHAT IS THE RATE FOR CALLING AUSTRALIA?", the system 100 might produce a more precise intent guess 140: "INTERNATIONAL CALLING RESEARCH." It should be noted from these examples that this is quite distinct from auto-completion where such a leap from initial portions of a thought to a final thought intent are not possible.

Presentation

Figure 2:
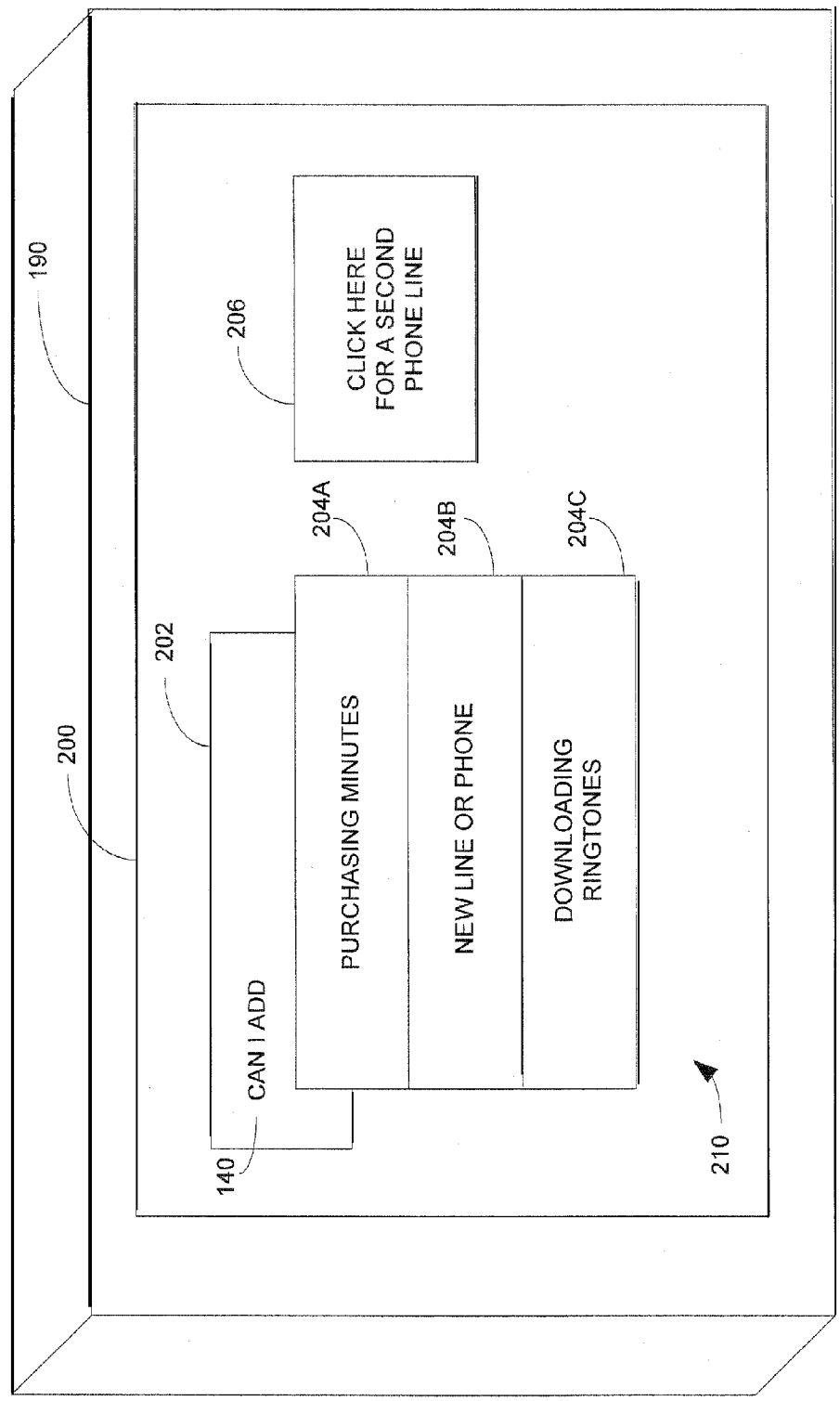
FIG. 2 is a diagram showing how suggested intents and their responses might be presented.

FIG. 2 shows a computer 190 for accessing and displaying a web page 200 that serves as an interface to the query system 100 shown in FIG. 1. FIG. 2 shows one way in which intent guesses 204A-204C may be displayed to an end user, as a list of choices in a drop down menu 210 below a query box 202. The query system 144 accesses intent guessing system 100 (FIG. 1) in response to a user entering the partial user query 140 "CAN I ADD". The intent guessing system 100 then returns the intent guesses 204A-204C shown in drop down menu 210 as described above in FIG. 1.

In addition, as described in the co-pending U.S. patent application Ser. No. 11/464,443, filed Aug. 14, 2006, entitled: METHOD AND APPARATUS FOR IDENTIFYING AND CLASSIFYING QUERY INTENT, any combination of intents 204A-204C may be associated with intent responses, such as intent response 206, which is meant to be presented to the end user when an associated intent guess matches the query 140.

The responses 206 may be promotions, links, or any other helpful piece of information relevant to the intent 204. These responses 206 may be displayed within the framework of the intent guesser system 100, for example, by showing the intent response 206 when the end user hovers a cursor over the associated intent guess 204A-204C. This has the benefit of allowing the user to see more information about the intent guesses 204A-204C before selecting one, and also allows the user to take a desired action without ever issuing the query to a search system.

Example

As an example, referring to FIGS. 1 and 2, query corpus 102 may contain many earlier logged queries including the following possibilities:

1. Adding minutes to my plan
2. Can I include more minutes?
3. Is it possible to add an additional phone line?
4. How do I put ringtones on my phone?

The model trainer 116 is responsible for generating a model 126 from these queries. The model trainer 116 uses the context generator 128 and language analyzer 106 to identify relevant features 114 from the corpus queries 104. For example, the features 114 for query (1) might include the tokens "adding", "minutes", "to", "my", and "plan"; the stems "add", "minute", "to", "my", and "plan"; and the concepts <add>, <minute>, and <plan>. The features 114 for query (2) might include the tokens "can", "i", "include", "more", and "minutes"; the stems "can", "i", "include", "more", and "minute"; and the concepts <add> and <minute>. Notice that although the queries are quite different, they share many of the same features 114, for example the token "minutes" and the concept <add>.

As described in the aforementioned co-pending patent application, these queries are associated with intents: queries (1) and (2) might be associated with the intent 204A "PURCHASING MINUTES"; query (3) with intent 204B "NEW LINE OR PHONE"; and query (4) with the intent 204C "DOWNLOADING RINGTONES".

The model trainer 116 generates a model 126 using the features 114 and the intents 204 mentioned above. Again as mentioned above, the exact nature of the model 126 will vary depending on the technology used, but may be some data structure with statistical associations between features and outcomes.

At this point, the query system 144 might receive a user query 140 "CAN I ADD", as shown in FIG. 2. The intent guesser 138 uses the context generator 128 and language analyzer 106, just like the model trainer 116, to determine the features 130 of the partial user query "CAN I ADD". The features 130 may include the tokens "can", "i", and "add"; the stems "can", "i", and "add"; and the concept <add>. These features 130 are then sent to the model 126 which outputs the intent guesses 124 most likely to be associated with features 130.

In the example shown in FIG. 2, the model 126 determines that the intent guesses 204A-204C: "PURCHASING MINUTES", "NEW LINE OR PHONE", and "DOWNLOADING RINGTONES", respectively, are all possibilities. The intent 204A "PURCHASING MINUTES" is listed first as the most likely intent because the model 126 determined that intent 204A is most closely associated with the features in query 140 than the other intents 204B and 204C. For example, intent 204A has more instances of the concept <add> plus the tokens "can" and "i". The resulting intents 204 are presented to the user as shown in FIG. 2.

Figure 3:
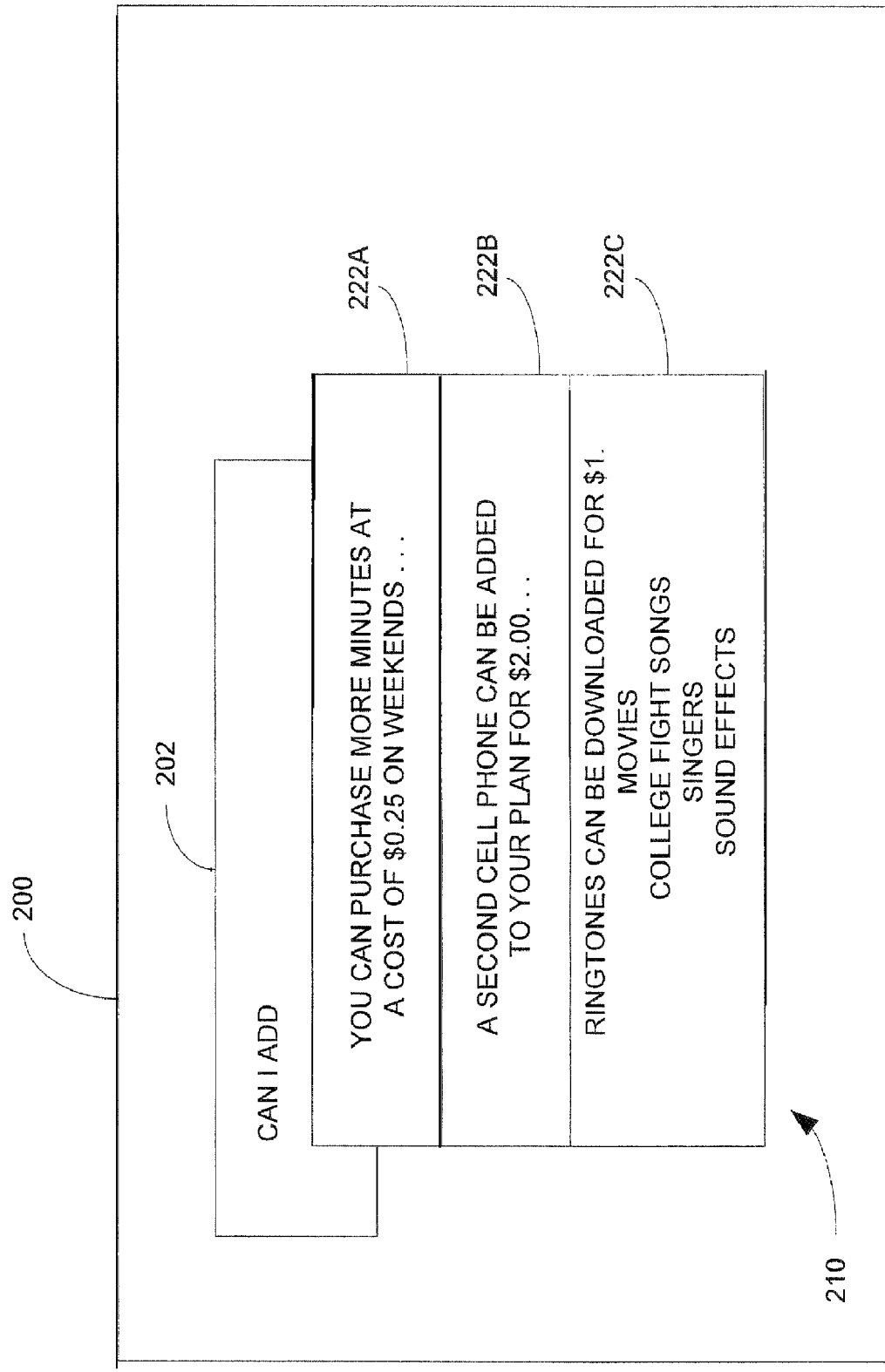
FIG. 3 is a diagram for an alternative way to show suggested intents and their responses.

FIG. 3 shows an alternative embodiment for displaying the intent responses 222A-222C. Instead of displaying intent 204A in FIG. 2, the query system 144 may display a response 222A associated with the intent 204A. In this case, the response 222A is a link to a web page that allows a user to purchase additional cell phone minutes. Similarly, instead of displaying intent 204B in FIG. 2, the query system 244 may display an intent response 222B that when selected links the user to a web page for purchasing a new phone line. Any combination of intents 204 in FIG. 2 and intent responses 222 in FIG. 3 can be displayed on the web page 200 as a drop down menu 210 or as separate icons 206.

Parameterized Intents

Figure 4:
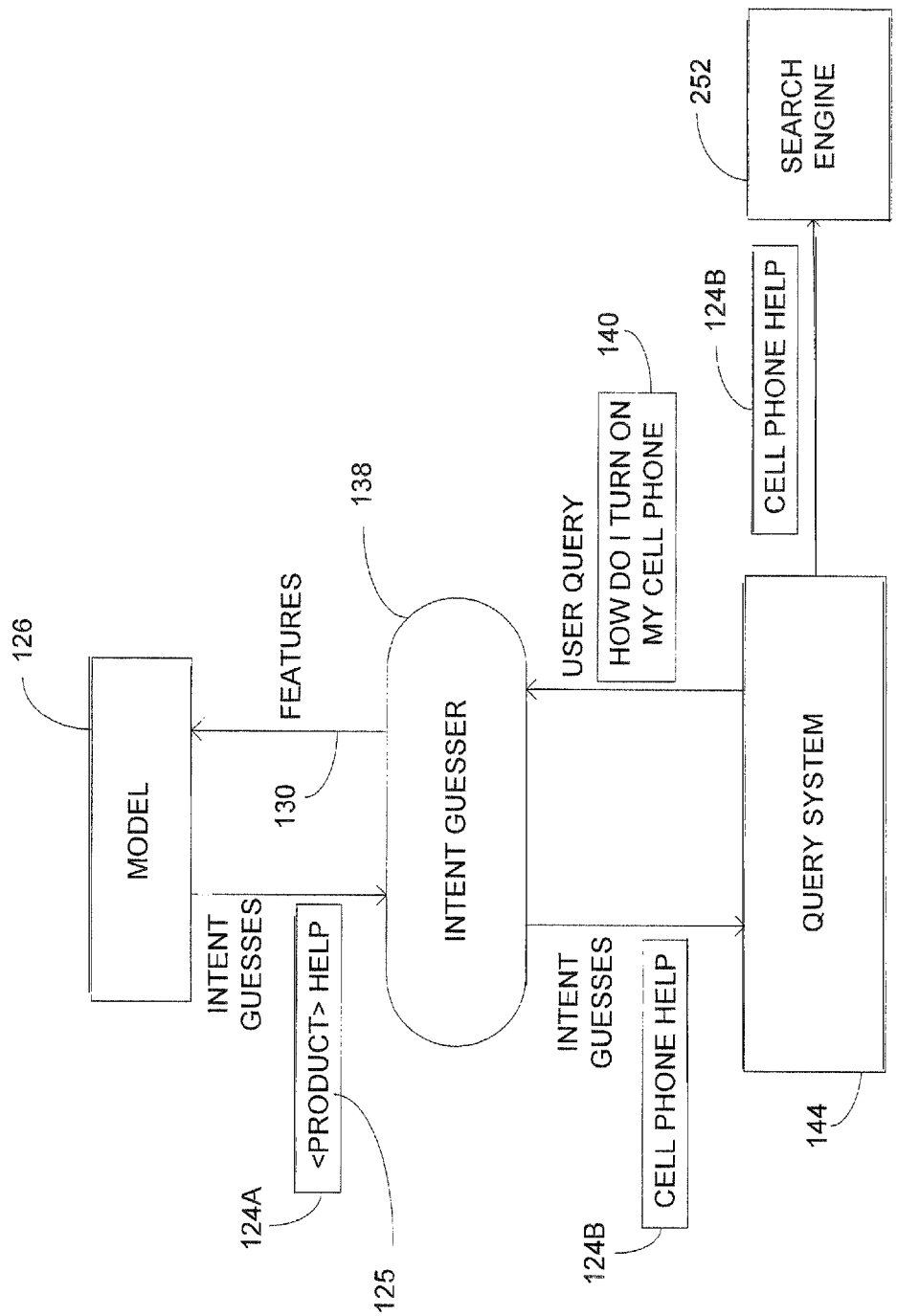
FIG. 4 is a diagram showing how parameterized intents might be handled.

FIG. 4 shows an example of a parameterized intent 124A that is sent back by the model 126. The parameterized intent 124A may include a generalized concept, such as the concept 125 <PRODUCT>. The model 126 may send back a parameterized intent 124A when the identified intent may require a specific type of information from the query 140. For example, the model 126 may determine that the query 140 is asking for help about a product. However, there may not be a particular intent associated with the product referred to in the user query 140. Accordingly, the model sends back a generalized and parameterized intent 124A that identifies the concept <PRODUCT> and the word HELP.

The concept 125 in intent 124A causes the intent guesser 138 to search through the associated user query 140 for one or more words that can replace the <PRODUCT> concept 125. In this example, the intent guesser 138 identifies the words CELL PHONE in query 140 that correspond to the concept <PRODUCT> in intent 124A. The intent guesser 138 replaces the concept <PRODUCT> with the words CELL PHONE and sends the revised intent 124B to the query system 144.

The query system 144 then displays the revised intent 124B CELL PHONE HELP to the user. If the intent CELL PHONE HELP is selected by the user, then the query system 144 sends the intent to a search engine 252 to retrieve the related information.

Intent Probability

Figure 5:
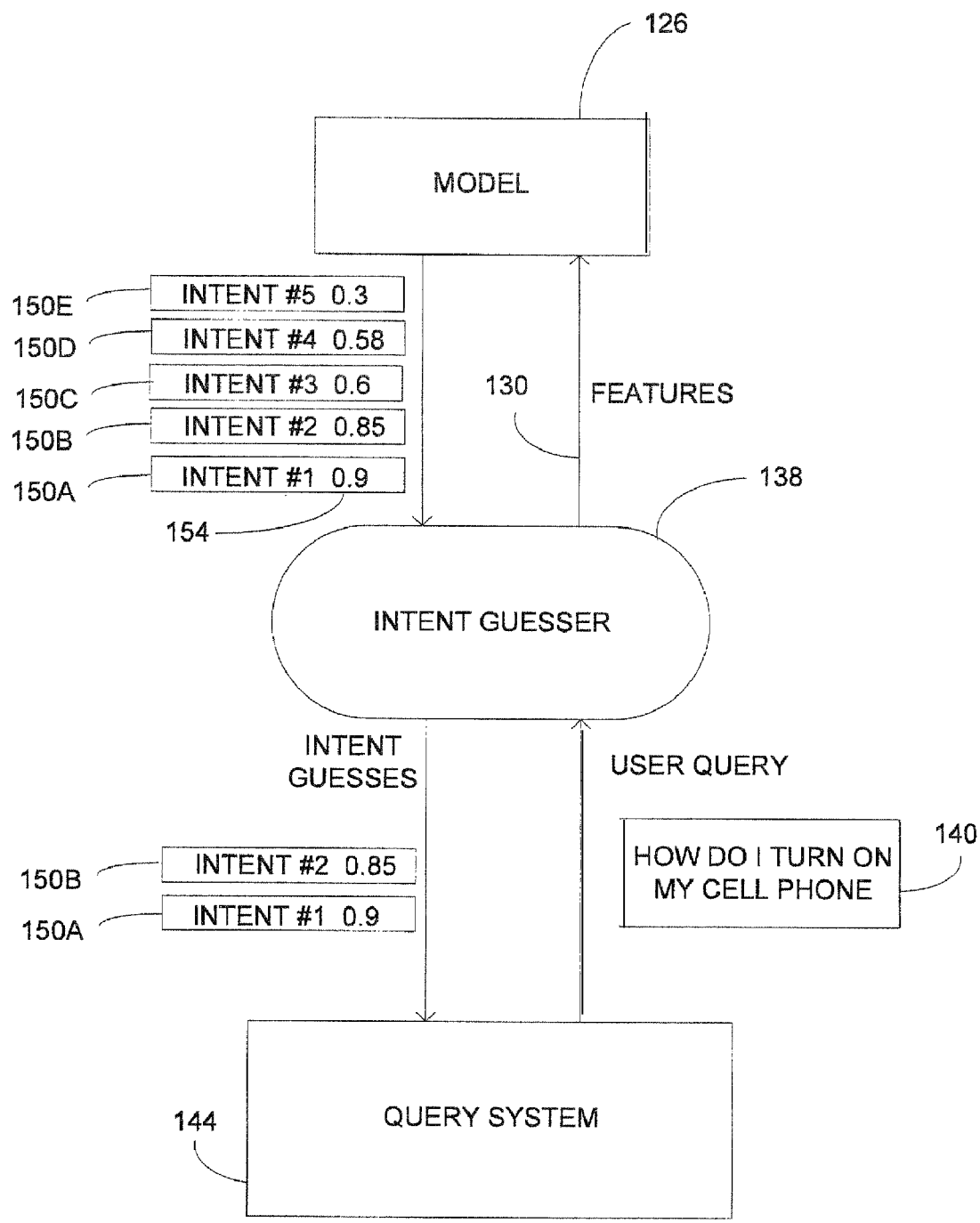
FIG. 5 is a diagram showing how weighted intents might be handled.

FIG. 5 shows a set of intents 150 that are output by the model 126 in response to the features 130 for a particular user query. Each intent 150A-150E may have an associated probability value 154 that indicates the probability of the intent correctly matching the intent of the user query. The probabilities 154 can be assigned by the model 126 according to the number of features 130 in the user query 140 that match features associated with the intents 150. Of course other parameters can also contribute to the probability values 154, such as matches for particular types of word or concepts.

In order to provide only the most relevant intents to the user, the intent guesser 138 uses one or more thresholds to determine which intents are sent back to the query system 144. It may happen that many intents fall within different ranges where a first high probability range contains most of the intents likely to be responsive to the user query 140. Other intents may be banded within lower ranges that are much less likely to provide helpful responses.

Accordingly, the intent guesser 138 only forwards the intents 150 in the upper probability range to the query system 144. For example, in FIG. 5, the two intents 150A and 150B are both in an upper probably range and all other intents 150C-150E are in substantially lower ranges. Accordingly, only intents 150A and 110B are sent back to query system 144 in response to user query 140.

Environment

The operations described in FIGS. 1-4 are performed by a computer, processor, and/or computer server. Furthermore, the system described above can use dedicated processor systems, micro controllers, programmable logic devices, or microprocessors that perform some or all of the operations. Some of the operations described above may be implemented in software and other operations may be implemented in hardware.

Figure 6:
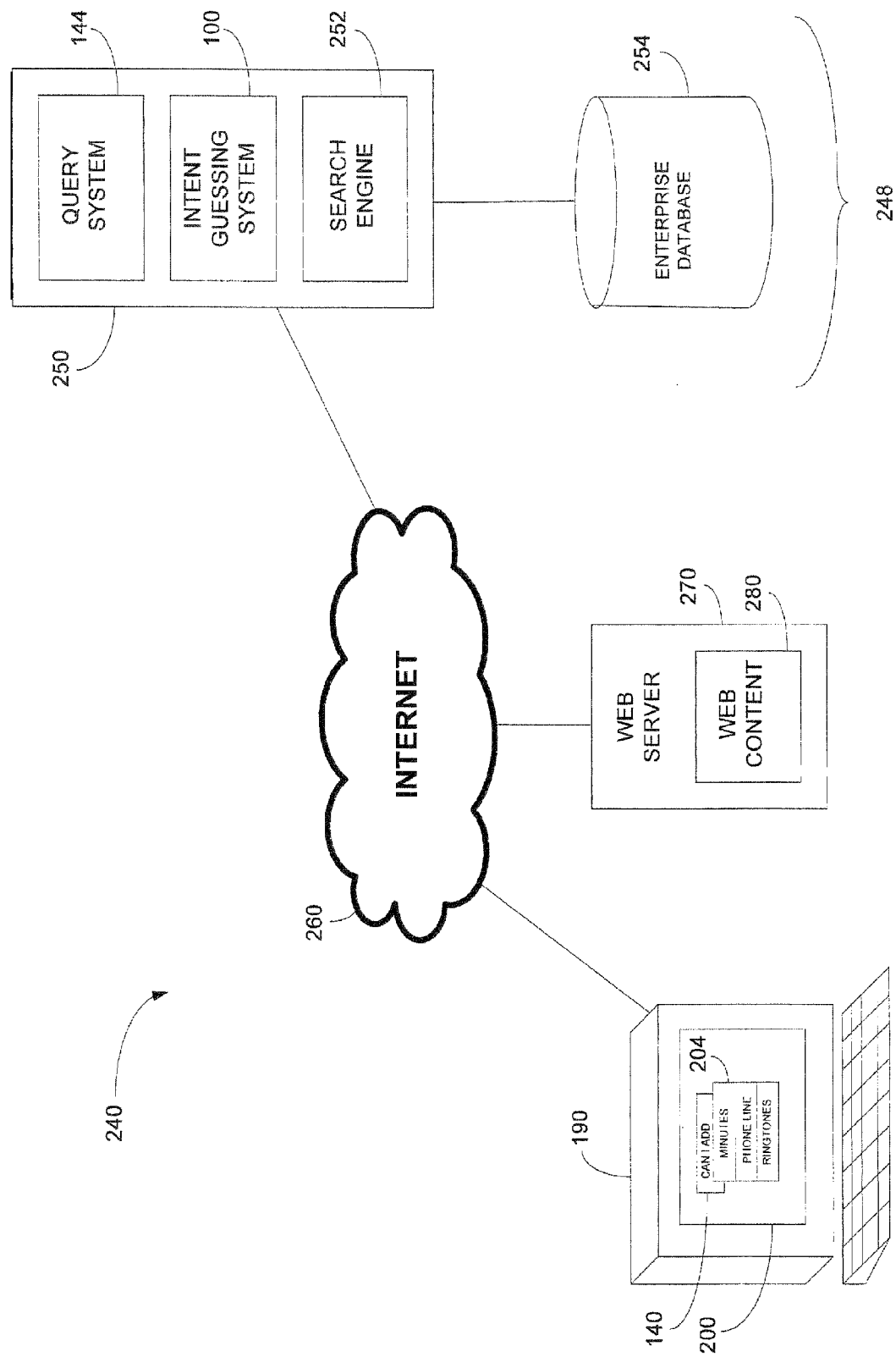
FIG. 6 is a diagram describing an environment for the intent guessing system in FIG. 1.

For example, FIG. 6 shows a computer network system 240 that includes an enterprise network 248 that has one or more enterprise servers 250 and one or more enterprise databases 254 that contain content associated with enterprise network 248. For example, the enterprise network 248 may be operated by a cell phone service provider. In this example, the enterprise database 16 may contain information related to cell phone purchasing and service. In another example, the enterprise network 248 may be associated with a car manufacturer or car dealership and the enterprise database 254 includes vehicle information. These are, of course, just two examples and any other type of business or entity can also be associated with enterprise network 248.

Other web servers 270 may operate outside of the enterprise network 248 and may include associated web files or other web content 280. Examples of content stored in enterprise database 254 and in web file server 270 may include HTML web pages, PDF files, Word® documents, structured database information or any other type of electronic content that can contain essentially any type of information.

Some of the information may be stored in a structured format referred to generally as structured content. Data may be stored in the enterprise database 254 in a preconfigured format specified for enterprise network 248. For example, a cell phone service price list may be considered structured content. Alternatively, other information that is contained in enterprise database 254, or contained on other web server 270, may be considered non-structured content. This may include HTML web pages, text documents, or any other type of free flowing text or data that is not organized in a preconfigured data format known by the query system 144.

A query may be initiated from the computer 190 through a User Interface (UI) 200 that in one example may be a web page displayed by a web browser. The computer 190 in one example may be a Personal Computer (PC), laptop computer, wireless Personal Digital Assistant (PDA), cellular telephone, or any other wired or wireless device that can access and display content over a packet switched network 260. In this example, the query 140 is initiated from the UI 200 and transported over the Internet 260 to the enterprise server 250.

The novel intent guessing system 100 provides one or more intent guesses 204 to the query system 144 as described above. The intent guesses 204 provided by the intent guessing system 144, along with other responses, are then sent back to computer 190 for displaying on the UI 200.

The user may select any of the identified intents 204. The selected intent is sent back to the enterprise server 250. The query system 144 then sends the selected intent 204 to search engine 252 to search for associated structured and/or non-structured content either in the enterprise database 254 or web server 270. Any results from the search are then sent back to the terminal 200 via the query system 144. In another embodiment, some or all of the query system 144, intent guessing system 100 and search engine 252 may be located and operated on terminal 190.

The enterprise server 250 may include one or more processors that are configured to operate the query system 144, intent guessing system 100, and search engine 252. The operations performed by the server 250 could be provided by software computer instructions that are stored in a computer readable medium, such as memory on server 250. The instructions are then executed by a processor in server 250. It should be understood that the examples presented below are used for illustrative purposes only and the scope of the invention is not limited to any of the specific examples described below.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A method of processing a current user query, comprising:
   training a model, said training comprising:
      continuously logging previous user queries;
      extracting a question from the continuously logged previous user queries;
      analyzing the extracted question to obtain at least one feature;
      assigning an intent to the extracted question; and
      adding an entry to the model and mapping the obtained feature for the extracted question to the assigned intent for the extracted question in the added entry of the model;
   receiving an initial portion of the current user query, wherein the initial portion includes a particular string of text;
   guessing an intent associated with the initial portion of the current user query while a remainder of the current user query is being received, wherein said guessing using only the initial portion further comprises:
      analyzing the initial portion to obtain at least one feature;
      comparing, using a processing device, the obtained at least one feature of the initial portion to entries in the model;
      selecting, using the processing device, at least one entry from the model based on the comparison; and
      determining the intent for the initial portion of the current user query according to an intent included in the selected entry;
   wherein the intent guess obtained for the initial portion according to said analyzing, said comparing, said selecting, and said determining, does not include any portion of the particular text string; and
   responding to the initial portion of the current user query with the intent guess.

2. The method according to claim 1, wherein the at least one feature includes at least one selected from the group comprising query tokens, query token stems, and concepts.

3. The method according to claim 1, further comprising:
   identifying a parameterized intent guess that includes at least one concept;
   identifying words in the current user query that are associated with the concept;
   modifying the parameterized intent guess by replacing the concept with the identified words from the current user query; and
   responding to the current user query with the modified parameterized intent guess.

4. The method according to claim 1, further comprising:
   identifying a response associated with the intent guess; and
   either displaying the response along with the associated intent guess or displaying the response instead of the associated intent guess.

5. The method according to claim 4, wherein the response includes links to web pages or additional information associated with the intent guess.

6. The method according to claim 1, further comprising:
   identifying a plurality of intent guesses associated with the current user query;
   identifying an order for the intent guesses of the plurality according to how well the intent guesses match the current user query; and
   displaying the intent guesses in the identified order.

7. An article of manufacture including a computer-readable medium having instructions stored thereon that, in response to execution by a computing device, cause the computing device to perform operations comprising:
- receiving an initial portion of a current user query, wherein the initial portion includes a particular string of text;
- training a model, said training comprising:
  - continuously logging previous user queries;
  - extracting a question from the continuously logged previous user queries;
  - analyzing the extracted question to obtain at least one feature;
  - assigning an intent to the extracted question; and
  - adding an entry in the model and mapping the obtained feature for the extracted question to the assigned intent for the extracted question in the added entry of the model;
- guessing an intent associated with the initial portion of the current user query while a remainder of the current user query is being received, wherein said guessing using only the initial portion further comprises:
  - inputting the initial portion into a context generator to obtain at least one feature corresponding to the initial portion;
  - analyzing the obtained feature of the initial portion according to the model, wherein the analysis includes comparing the obtained at least one feature of the initial portion to entries in the model;
  - selecting, using the processing device, at least one entry from the model based on the comparison; and
  - determining the intent for the initial portion of the current user query according to an intent included in the selected entry;
- wherein the intent guess obtained for the initial portion according to said analysis, said selecting, and said determining does not include any portion of the particular text string; and
- responding to the initial portion of the current user query with the intent guess.

8. The article of manufacture according to claim 7, wherein the operations further comprise:
- identifying a first subset of words from the initial portion while the current user query is being entered;
- making an intent guess based on the first subset of words; and
- replying to the first subset of words with the intent guess while the current user query is still being entered.

9. The article of manufacture according to claim 7, wherein the operations further comprise:
- identifying at least one question class that includes at least one concept;
- identifying words in the current user query that are associated with the concept;
- modifying the identified question class by replacing the concept with the identified words in the current user query; and
- responding to the current user query with the modified question class.

10. The article of manufacture according to claim 9, wherein the operations further comprise:
- identifying confidence factors for the question classes; and
- displaying the question classes according to the identified confidence factors.

11. The article of manufacture according to claim 9, wherein the question classes include associated probability values that indicate a probability that the question classes correctly respond to the current user query and the question classes are sent or not sent in response to the current user query according to the associated probability values.

12. The article of manufacture according to claim 7, wherein the operations further comprise:
- identifying additional information associated with the intent guess; and
- either displaying the identified additional information with the intent guess or displaying the additional information instead of the intent guess.

13. An apparatus, comprising:
- a processor; and
- a memory to store instructions that, when executed by the processor, are operable to:
- receive an initial portion of a current user query, wherein the initial portion includes a particular string of text;
- train a model, said training comprising:
  - continuously logging previous user queries;
  - extracting a question from the continuously logged previous user queries;
  - analyzing the extracted question to obtain at least one feature;
  - assigning an intent to the extracted question; and
  - adding an entry to the model and mapping the obtained feature for the extracted question to the assigned intent for the extracted question in the added entry of the model;
- guess an intent associated with the initial portion of the current user query while a remainder of the current user query is being received, wherein the guess using only the initial portion includes the following operations:
  - extracting at least one feature from the initial portion;
  - comparing, using the processing device, the extracted at least one feature to entries from the model;
  - selecting, using the processing device, at least one entry from the model based on the comparison; and
  - determining the intent for the initial portion of the current user query according to an intent included in the selected entry;
- wherein the intent guess obtained for the initial portion according to said extracting, said comparing, said selecting, and said determining does not include any portion of the particular text string; and
- respond to the initial portion of the current user query with the intent guess.

14. The apparatus of claim 13, wherein the processing device is configured to:
- identify a parameterized intent guess that includes at least one concept;
- identify words in the current user query that are associated with the concept;
- modify the parameterized intent guess by replacing the concept with the identified words from the current user query; and
- respond to the current user query with the modified parameterized intent guess.

15. The apparatus of claim 13, wherein the at least one feature includes at least one selected from the group comprising query tokens, query token stems, and concepts.

* * * * *